United States Patent
Mayer (10) Patent No.: US 6,915,171 B2
(45) Date of Patent: Jul. 5, 2005

(54) AUTOMATIC PROCEDURE FOR LOCATING ACTUATOR ADDRESSES ON A BUS SYSTEM

(75) Inventor: Walter Mayer, Brühl (DE)

(73) Assignee: Visteon Global Technologies, Inc., Dearborn, MI (US)

( * ) Notice: Subject to any disclaimer, the term of this patent is extended or adjusted under 35 U.S.C. 154(b) by 734 days.

(21) Appl. No.: 09/842,467

(22) Filed: Apr. 26, 2001

(65) Prior Publication Data

US 2002/0161456 A1 Oct. 31, 2002

(51) Int. Cl.$^7$ .............................. G05B 11/01
(52) U.S. Cl. ....................... 700/13; 700/24
(58) Field of Search .................. 700/19, 23–24, 700/54, 56–58, 64, 13; 340/648, 653, 657–659; 318/565–567; 236/75, 49.3; 710/306

(56) References Cited

U.S. PATENT DOCUMENTS

| | | | |
|---|---|---|---|
| 3,629,783 A | * 12/1971 | Holzwarth | 439/31 |
| 4,085,403 A | 4/1978 | Meier et al. | 340/3.2 |
| 4,526,503 A | 7/1985 | Muraguchi | 414/433 |
| 4,845,843 A | 7/1989 | Babcock | 29/829 |
| 5,350,983 A | * 9/1994 | Miller et al. | 318/254 |
| 5,440,486 A | 8/1995 | Rudzewicz et al. | 701/36 |
| 5,469,150 A | 11/1995 | Sitte | 340/3.2 |
| 5,483,230 A | 1/1996 | Mueller | 340/825 |
| 5,671,387 A | 9/1997 | Jacobs et al. | 711/210 |
| 5,803,355 A | 9/1998 | Ureshino et al. | 236/13 |
| 5,987,474 A | 11/1999 | Sandifer | 707/104.1 |
| 6,052,631 A | 4/2000 | Busch et al. | 701/29 |
| 6,114,970 A | 9/2000 | Kirson et al. | 340/825.52 |
| 6,131,119 A | 10/2000 | Fukui | 709/224 |
| 6,771,178 B2 | * 8/2004 | Bruzy et al. | 340/648 |
| 6,775,767 B2 | * 8/2004 | Hinrichs et al. | 713/1 |
| 2001/0044860 A1 | * 11/2001 | Hinrichs et al. | 710/9 |
| 2002/0096573 A1 | * 7/2002 | Bruzy et al. | 236/75 |
| 2003/0052180 A1 | * 3/2003 | Huhn et al. | 236/49.3 |
| 2004/0199703 A1 | * 10/2004 | Wurth et al. | 710/306 |

FOREIGN PATENT DOCUMENTS

WO    WO 00/78499 A1    12/2000

* cited by examiner

Primary Examiner—Anthony Knight
Assistant Examiner—Ronald D Hartman, Jr.
(74) Attorney, Agent, or Firm—Brinks Hofer Gilson & Lione (57) ABSTRACT

An automatic procedure for locating actuator addresses on a bus system is revealed. The actuators may be identical except for their physical position, and thus their function and address on a bus system that controls and powers the actuators. Because their functions are different, the control system can determine which actuator is in which location, and thus locate the address for each actuator on the bus. Each actuator may then receive and act upon commands from the control system appropriate to its location and function. As a result, a manufacturer or dealer can stock a single actuator, rather than many actuators. Several such actuators would otherwise have to be manufactured and stocked separately, even though the only difference between them might be an installed software or firmware program to identify and control each actuator. Additionally, fewer wires may be required in harnesses to control the actuators.

17 Claims, 7 Drawing Sheets

AUTOMATIC PROCEDURE FOR LOCATING ACTUATOR ADDRESSES ON A BUS SYSTEM

BACKGROUND OF THE INVENTION

Modern automobiles have many electrical accessories and devices for providing transportation and comfort to passengers. Every solenoid, motor, and actuator in an automobile must be subject to the control of the operator or an operating system of the vehicle and must have a way to receive electrical power. This need for both power and control can rapidly lead to a profusion of wires and wire harnesses throughout the vehicle. Part of the profusion problem can be solved by placing some electrical devices on a bus, typically a wiring harness connected to a plurality of devices rather than a single device.

Another aspect of the situation is that such an accessory or a system in an automobile may have a plurality of a single part, such as a number of identical motors or actuators on a bus. That is, a number of actuators may be tied together on a bus, each located in a different physical location, each with its own function peculiar to its location. Because the parts or the actuators are identical, it may be wasteful to manufacture and stock a plurality of part numbers, each part number comprising an actuator and a software program embedded in an electronic device within the actuator, and containing the operating instructions needed for that actuator to function in one particular location. Even though the parts are physically identical, each actuator differs in its need for unique software or controls according to its location and function. It would be desirable to manufacture and stock only a single actuator with a standard program embedded, rather than a plurality of actuators that differ only in the installed software or firmware, and the actuator's functional position in the automobile. Each actuator also needs to select the proper bits from the command bitstream on the bus, and thus each actuator needs to know its address on the bus.

The present invention is directed to an improved procedure for determining the location or address of an actuator in an automobile system without unnecessary wiring and without the burden of manufacturing, purchasing and stocking a plurality of actuators which differ only in their installed software for a particular functional position in the automobile.

BRIEF SUMMARY OF THE INVENTION

The present invention provides a method for determining the address of an actuator controlled by a system bus. The method includes identifying end-stops for the actuator by exercising the actuator. The address of each actuator is then determined by its end-stops, which also identifies the physical location of the actuator. The purpose is to use a single actuator in a plurality of applications or positions, rather than a multitude of actuators. The end-stops may be identified in several ways. In one embodiment, the actuator is exercised and the end stops are identified using their absolute position. In another embodiment, the end stops are identified using their position relative to some reference or standard. The method may also include installing the actuator as part of a system, the system typically having several actuators.

An embodiment is a positioning system or apparatus in which there is a plurality of actuators and a control bus connected to the actuators. Each actuator has unique end-stops, and the address of each actuator in the control bus may be determined through its end-stops. One embodiment is such an apparatus used for heating and cooling a motor vehicle, that is, a heating and air-conditioning system for an automobile or a truck.

DETAILED DESCRIPTION OF THE INVENTION

Figure 1:
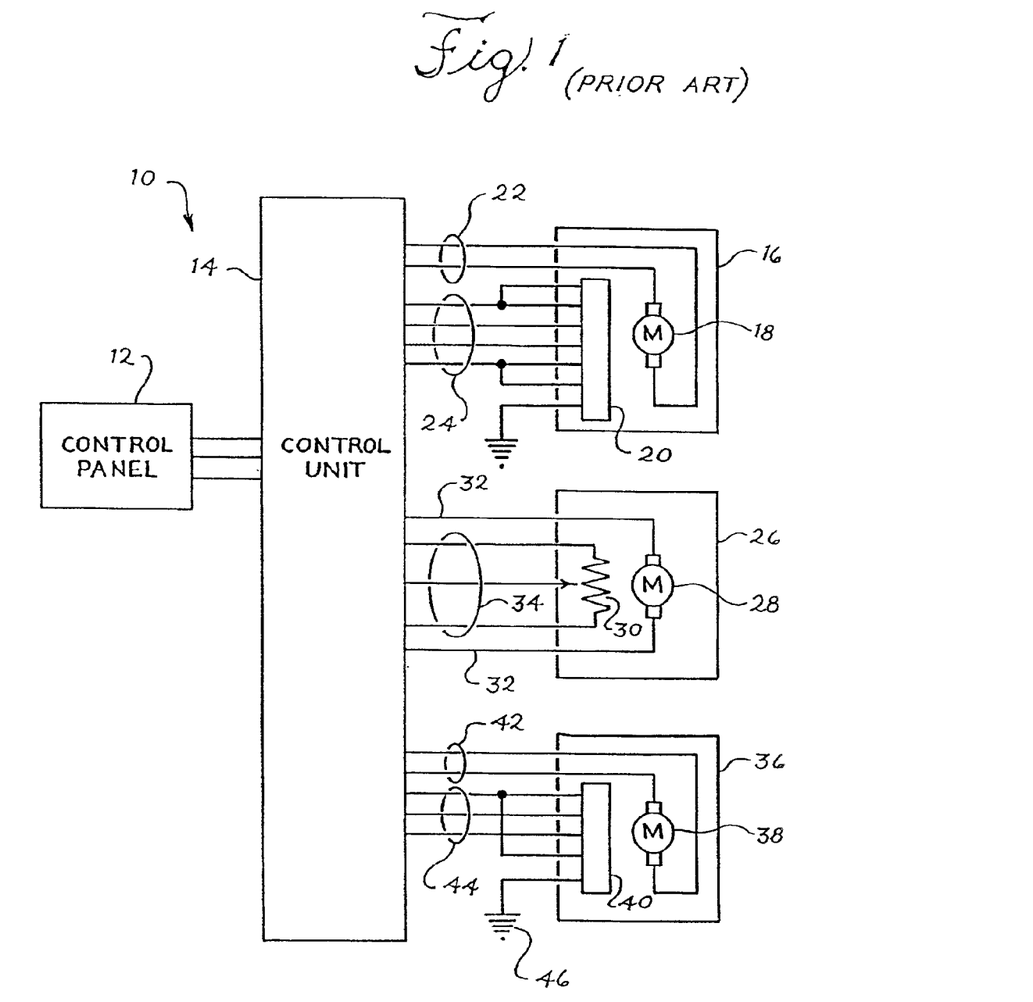
FIG. 1 is a prior art actuation system

FIG. 1 depicts a prior art system for actuation, such as one useful for the heating, ventilating and air-conditioning system of an automobile. An actuation or positioning apparatus 10 includes a control panel 12, such as an operator interface, and a control unit 14, such as a controller or a microprocessor controller. The controller controls a plurality of actuators, 16, 26 and 36. Each actuator is linked to the control unit by a wiring harness for control and for power. Actuator 16 links to the control unit for power to motor 18 through wiring harness 22 and for control and feedback 20 through 4-wire wiring harness 24. Actuators 26 and 36 are similarly situated, with power harnesses 32 and 42 for motors 28 and 38 respectively. Actuator 26 may have a voltage-divider feedback device 30 connected mechanically to actuator travel and fed back to the control unit via wiring harness 34. Feedback device 40 also uses a 3-wire harness 44 for communication to controller 14. In this example, it requires 6 harnesses and at least 16 wires to control three actuators.

Another disadvantage may lie in the circumstance in which the actuators themselves are identical, except for the location of the actuators in the apparatus, such as a heating/ventilating apparatus. Each actuator may require only a different control or different program in order to function in its proper location. If there are three identical actuators, such as door actuators used in an apparatus, and all three require different programs, the manufacturer, the dealer, and the mechanic do not want to make or stock three different actuators. Rather, they would prefer to stock one actuator, and download the correct program into the actuator when it is installed. In addition, it is desirable to use a control bus, that is, a single harness for both control and power to all the actuators of such an apparatus.

Figure 2:
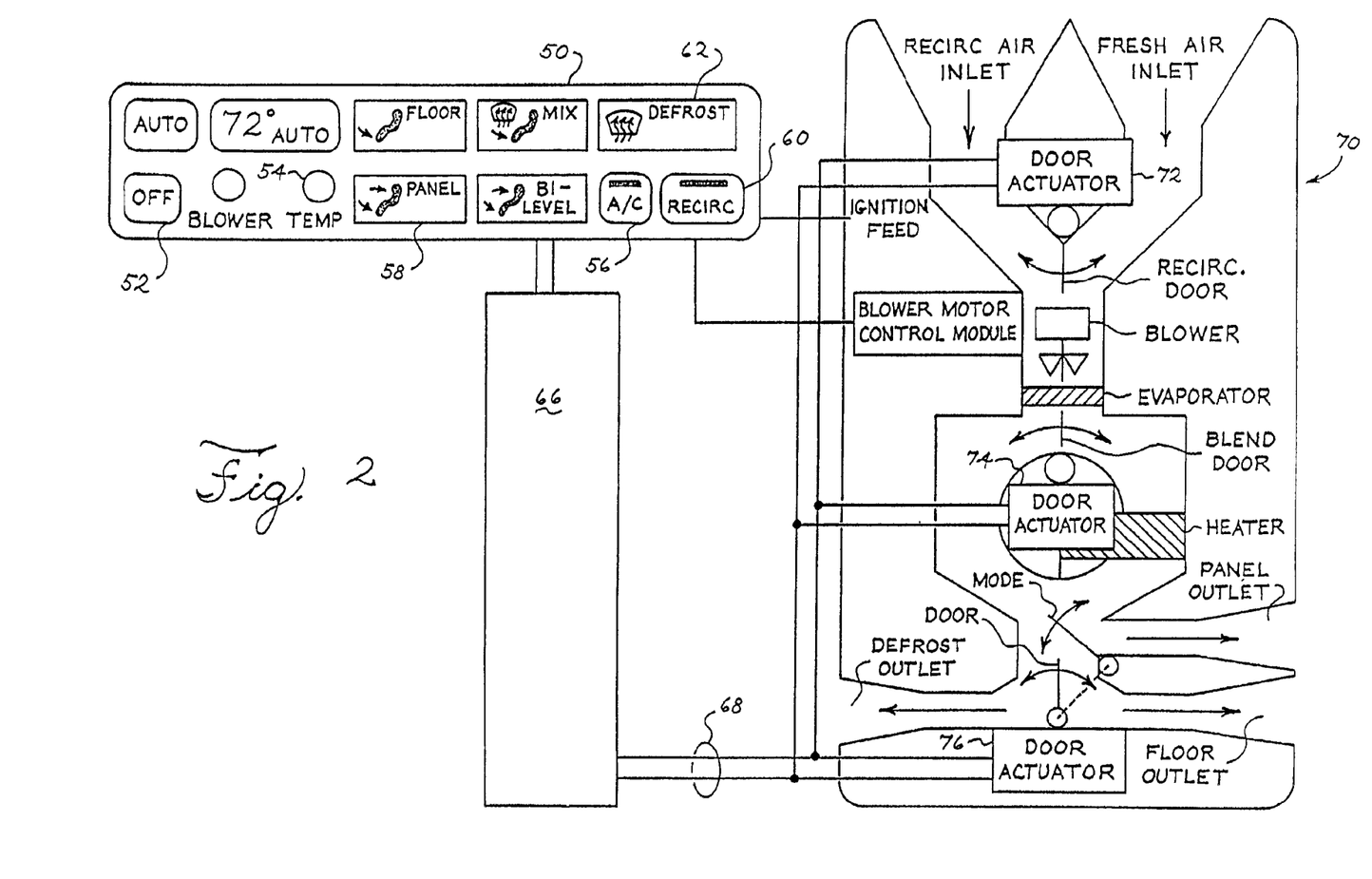
FIG. 2 is a block diagram of an embodiment of the invention.

FIG. 2 illustrates the desired situation. An environmental system for a motor vehicle includes an operator panel 50, a control unit 66, a wiring harness 68, and a positioning system 70. In this embodiment, the positioning system 70 includes three doors and three door actuators 72, 74 and 76, for choosing between recirculated air and fresh air, conditioned air and non-conditioned air, and circulation of the air to a higher or lower location, that is, for defrost or floor circulation. The controller sets the positions of the actuators in response to operator instructions. These instructions may be indicated through components of the operator panel, including a system on/off switch 52, a temperature setting 54, air conditioning on/off switch 56, desired direction of circulation 58, recirculation on/off 60, and defrost setting 62. These settings and controls are exemplary; others may be used.

In FIG. 2, a two-wire harness is used for the control system or bus. If the three exemplary actuators are all different, the problems of control are relatively simple. Each actuator will have a unique address on the bus and instructions from the controller or microcontroller or microprocessor will be easily given and as easily read by the actuator or its control element. In the situation where all three actuators are identical, however, the problem is more difficult, because each actuator may have slightly different functions, and it is generally undesirable to store different directions or instructions separately before installation.

Figure 3:
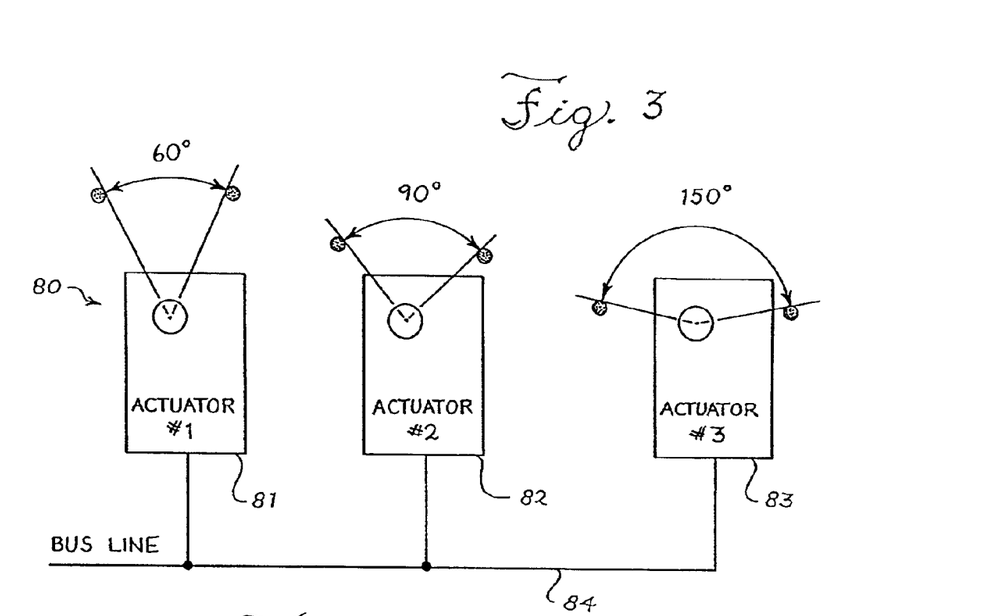
FIG. 3 is a block diagram depicting relative positioning data.

In one embodiment of the invention, an actuator Is installed in a positioning apparatus, such as an environmental system for a motor vehicle The situation is depicted in FIG. 3, in which the positioning system 80 has three actuators 81, 82 and 83, all controlled through a bus line 84. Each actuator has a different amount of travel, or in actuation terms, each actuator has different end-stops. Upon installation, a controller gives a special command, such as "initial addresses". Upon this command, each actuator travels its full travel, and notes its end-stops the example in FIG. 3 depicts a situation in which the first actuator 81 has a range of 60 angular degrees while the second actuator 82 has a range of 90 angular degrees, and the third actuator 83 has a range of 150 angular degrees. After exercising this travel, each actuator then determines its end stops and the controller assigns an address to each actuator that did not previously have an address assigned. The controller may also then download to such an actuator a control program or a portion of a control program for its assigned address/location.

The difference in end-stops or travel for each actuator must be sufficient for easy differentiation by feedback sensors, encoders, step-counters, current integrators, timers, and the like. In general, differentiation by electronic methods is far more accurate than mechanical ones. For instance, an electric motor running at 1800 rpm will go through many revolutions in causing a ballscrew nut or rotary actuator to traverse a few thousandths of an inch or a few minutes of an angle. Nevertheless, manufacturing tolerances and system performance must be respected when designing a positioning system utilizing the present invention. The differences in end-stops must be readily apparent to the actuators or devices used.

The actuators used may have controllers or microprocessor controllers not using firm-ware type EPROMs or EEPROMs, but rather using only RAM (random access memory), causing them to loose all data and the address if the vehicle battery is disconnected. Therefore, it may be necessary for the vehicle controller to go through the "initial addresses" or "initialize" sequence every time the vehicle battery is disconnected or the actuator RAM looses power.

In another embodiment, the control unit may compare the travel data from each actuator to data indicating the location of the actuator, as part of the step of determining the addresses. If the data do not match, the actuator may be re-assigned to its new location by the control unit, and re-programmed as necessary for the new location. In this manner, actuators that are interchangeable will remain so, without extensive re-programming.

Figure 4:
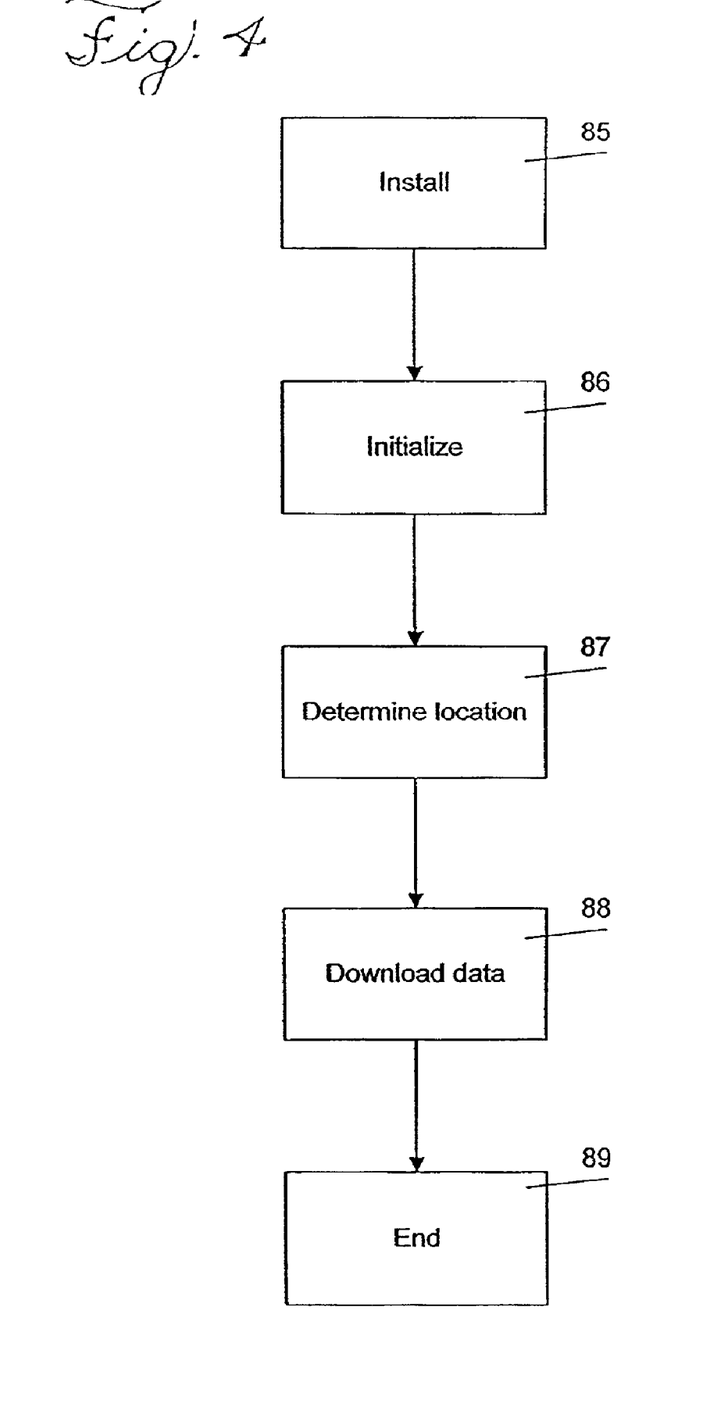
FIG. 4 is a flow chart for a method of determining an address.

The method is depicted in FIG. 4. An actuator is installed at 85 in a positioning system, such as an environmental control system. An installer or controller gives a command such as "initial addresses" or "initialize," or similar command at 86. The actuator exercises its travel in response to the command, identifies its end stops, and then compares the relative or absolute end stop positions for all the locations in the system, and determines the location of the actuator at 87, and thus its address on a bus. When the actuator reports its known address/location, the controller can download data appropriate for the functioning of the actuator in its location at 88. The install sequence then ends at 89 and returns the controller, the actuator, and the system to normal operation. Note that the "install" phase need only take place once, not every time, and that this method may also be used every time the controller loses memory, not merely upon the first installation.

The download portion of the method may take on many forms. In one preferred method, the software for each possible location is loaded into each actuator manufactured, divided into separately addressable locations within memory and a control device portion of the actuator. Upon determining the address of the actuator, the system controller instructs the actuator to use a particular program within its memory, and not to use others. The selected program then instructs the actuator as to which bits to select from a bitstream from the controller via the control bus, and how to respond to these commands, according to the program selected. In other embodiments, an entire control program or sequence may be loaded into the appropriate portion of the actuator from a system controller. This method, however, would have less control over the long term, and may lend itself to problems at least with traceability, if not updating.

The feedback from the actuator may take many forms. In FIG. 3, the data took the form of angular feedback in a relative form, rather than an absolute form. The angle may be measured in many ways, including the time for the motor to drive the distance between end stops, the number of revolutions of an encoder on the shaft of the motor or an element of the actuator, current integration over time on a capacitor, step counts on a stepper motor, the number of times an AC waveform passes through zero (for an AC motor), and so on.

Figure 5:
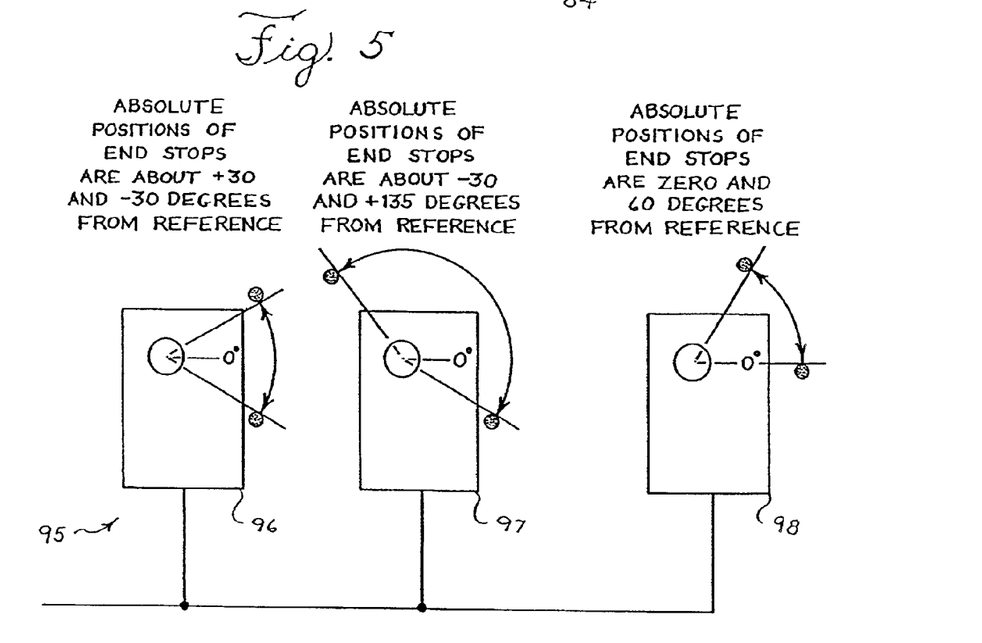
FIG. 5 is a block diagram depicting absolute positioning data.

In other situations, less data is needed when absolute values are used for exercising and positioning the actuators. A positioning system 95 may have its actuators installed in such a manner that its end stops are as shown in FIG. 5. Actuator 96 is installed such that its end stops are between about +30 and −30 angular degrees, rather than merely looking for a 60 angular degree difference. Actuator 97 has end stops at about −30 degrees and 135 degrees, rather than merely a 165-degree difference. Actuator 98 has 60-degree angular difference, and its end stops are between zero degrees and 90 degrees. Using this absolute positioning data, it is straightforward to distinguish between the position of actuators 96, 97 and 98. The actuator may determine its address for absolute data in the same manner as for relative data, with the proviso that absolute positioning may require less data than relative positioning, perhaps only one uniquely-identifiable end-stop rather than two, to identify itself to the controller.

In another embodiment, the "zero" or reference position may be used along with the end stops to measure a differential, that is a difference between an end stop and the zero or reference position, so long as the reference is within the end-stops of an individual actuator, such as actuators 96, 97, 98. In this way, a differential is measured between a reference and an end stop. In some embodiments, this also may be sufficient to distinguish between actuators.

Figure 6:
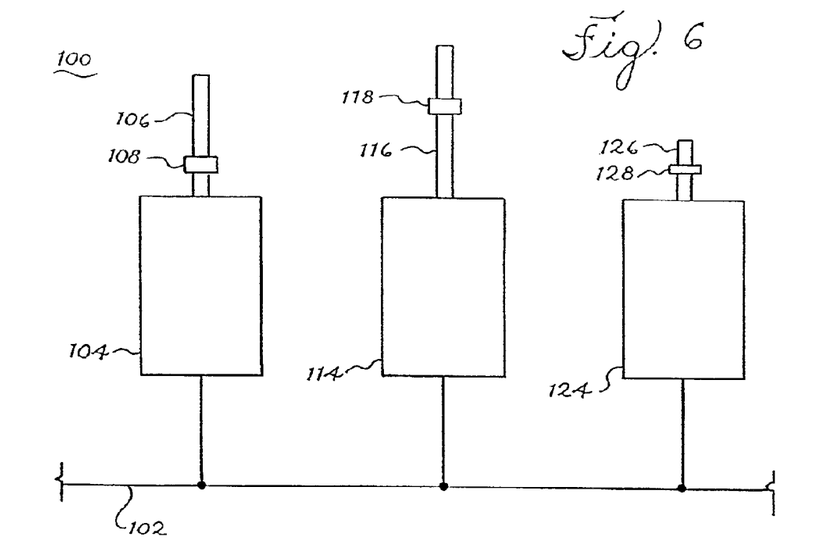
FIG. 6 depicts linear actuators on a bus system.

Another embodiment of a positioning system 100 with actuators on a bus is shown in FIG. 6, which depicts three linear actuators 104, 114, 124. The linear actuators may have linear axes 106, 116, 126 on which element 108, 118, 128 traverses, in response to a command from the actuator, responding to the system controller (not shown) though bus 102. In one embodiment, the linear axis may be a ballscrew and the traversing element may be a ballscrew nut. The traversing of the nut causes a part mechanically linked thereto to move in response to commands from a controller.

The invention is thus not limited to the rotary actuators shown earlier, but may encompass linear actuators, actuators acting on a cam surface for traverse in more than one plane, and other actuators known to those skilled in the art. Embodiments may also include a ring-bus system, in which the last actuator connects to the controller for feedback or other purposes.

Another way to practice the invention is a wireless bus, in which the actuators receive power from one source and commands from another source, such as an infrared or other wireless communication method. Such busses may come from a variety of technologies, including "Bluetooth™" wireless technology, owned by Telefonaktiebolaget L M Ericcson of Sweden and licensed to Microsoft Corp., and infrared technologies, such as IEEE 1394. A wireless "harness" solves the problem of wire proliferation, but the problem of actuator identification remains, and is solved by practicing the present invention.

Figure 7:
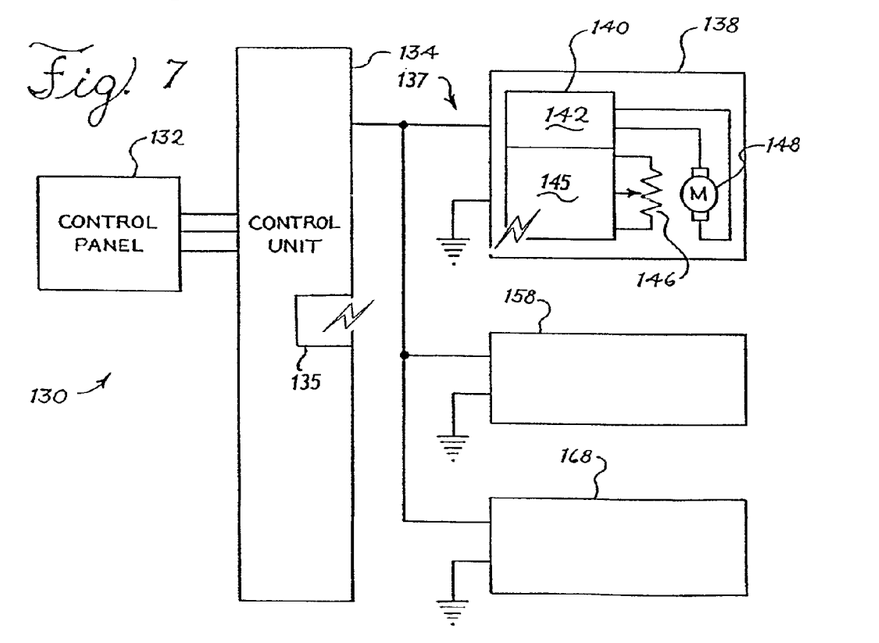
FIG. 7 is an embodiment of a positioning system with a wireless bus.

FIG. 7 illustrates this situation, in which a series of actuators receives power from a bus and commands from a "wireless bus," that is, remotely. A control panel 132, such as a user control panel, interfaces with and relays user commands to a control unit 134 having a wireless communicator 135 to actuators 138, 158 and 168. The control unit may be an on-board vehicle computer, or it may be a microprocessor controller dedicated to the positioning system. The control unit then relays commands wirelessly to the individual actuators 138, 158, 168. The control unit relays power via power bus 137. Each actuator is similar or identical to actuator 138, having a power and control section 140 with a power section 142 and a control section 145 for receiving wireless commands. The control section may include position feedback device 146, illustrated as a voltage divider, but with other feedback devices possible. The power section may rectify and relay electrical power to motor portion 148 of the actuator.

Figure 8:
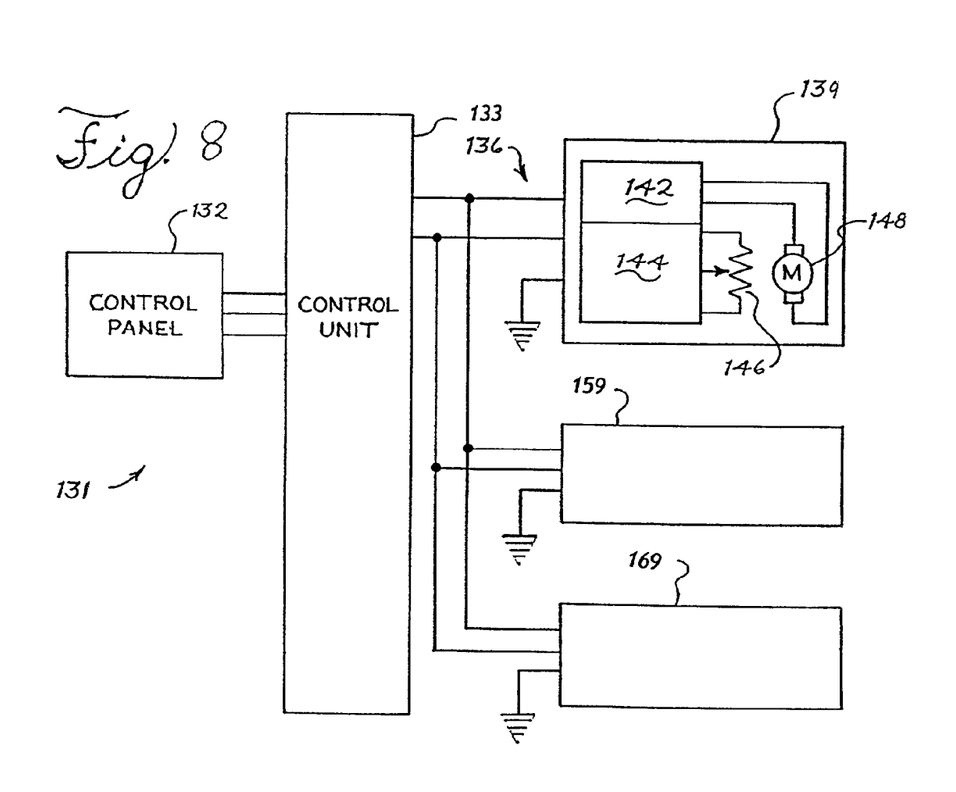
FIGS. 8 and 9 are block diagrams of other embodiments according to the present invention.

FIG. 8 is another embodiment of a positioning system 131 utilizing a plurality of actuators on a bus. A control panel 132, such as a user control panel, interfaces with and relays user commands to a control unit 133. The control unit may be an on-board vehicle computer, or it may be a microprocessor controller dedicated to the positioning system. The control unit then relays commands to the individual actuators 139, 159, 169 via 2-wire control and power bus 136. Each actuator is similar or identical to actuator 139, having a power section 142 and a control section 144. The control section may include position feedback device 146, illustrated as a voltage divider, but with other feedback devices possible. The power section may rectify and relay electrical power to motor portion 148 of the actuator.

Feedback devices are not necessarily limited by the parsimony of wires and data endemic to these embodiments. The data link between the actuator and feedback device need not extend back to the wiring harness or to the control unit for the positioning system. For instance, an encoder or a proximity sensor or even a linear feedback device, such as a slidewire, may use several wires internal to the actuator. All data processing, such as calculation of times, angles, distances, integration of voltage/current over time, etc., etc., may take place within the actuator and its control section. The data may then be converted to a signal, such as at least one 1-bit to N-bit datum that is reported to the controller when it queries the actuator for its position, its end-stops, etc.

Figure 9:
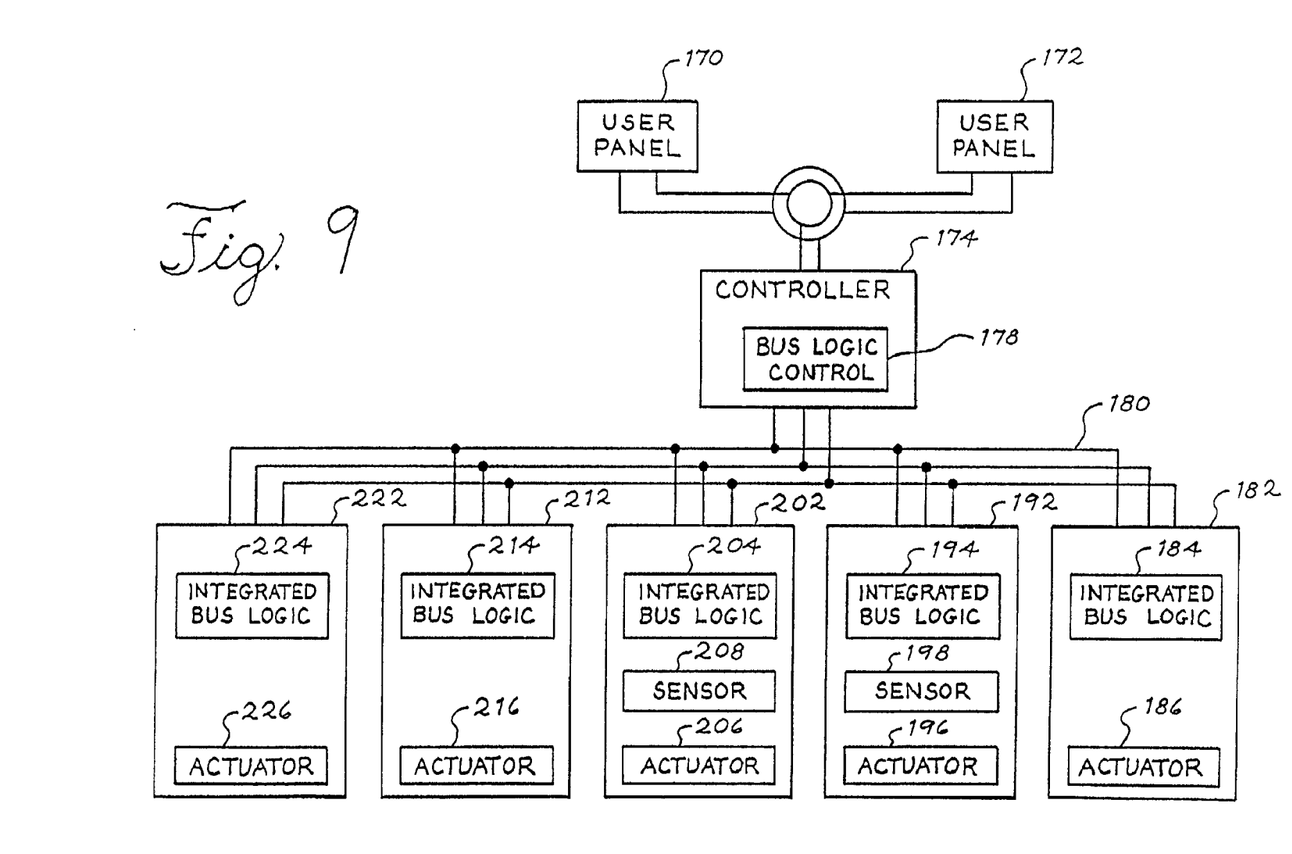

Embodiments are not limited to systems or apparatus having identical actuators or control elements. FIG. 9 depicts an apparatus with two user panels 170, 172 and two different types of actuators, some of which are identical and some of which are not. An example is a motor vehicle environmental system with separate controls for a driver and a passenger. In this embodiment, bus 180 links actuators 182, 192, 202, 212, 222 to controller 174 and bus logic control 178. Actuators 182, 212 and 222 are identical, and actuators 192 and 202 are also identical but are different from 182, 212 and 222. The difference may be the type of actuator (linear vs. rotary) or any of a host of other differences.

In this example, actuators 192 and 202 may have an integral sensor 198, 208, for continuously or periodically tracking the position of an actuated element of the actuator. This could be the travel on a ballscrew or the deflection on a rotary actuator. The other actuators do not have sensors, but all the actuators have a control element 184, 194, 204, 214, 224, wherein 194 and 204 are identical but may be different from 184, 214 and 224, which are also identical to each other. As described above, the control element for each actuator tracks the position and location of each actuator, determines its end-stops as required, and receives commands from the controller. When a new actuator is installed, the controller gives an initializing command, and each actuator exercises and determines its end-stops. The controller then compares the reported data to the expected data and assigns a location to the new actuator. As also described above, embodiments may be programmed to repeat this "initializing" sequence whenever the vehicle battery loses power or the actuators are cut-off from power.

There are also other ways to practice the invention. For example, harnesses of 3 or 4 wires or more may be used rather than 2-wire harnesses. While actuators have been described with integral grounds, shielded harnesses or additional wires for grounding may be used. While the descriptions have focused on passenger automobiles, the method and apparatus will work as well for an environmental system in a truck or boat or in a locomotive, where operator or passenger comfort may provide a sales advantage.

It is therefore intended that the foregoing description illustrates rather than limits this invention, and that it is the following claims, including all equivalents, which define this invention. Of course, it should be understood that a wide range of changes and modifications may be made to the embodiments described above. Accordingly, it is the intention of the applicants to protect all variations and modifications within the valid scope of the present invention. It is intended that the invention be defined by the following claims, including all equivalents.

What is claimed is:

1. A method for determining an address of an actuator on a system bus, comprising:

identifying at least one end-stop for an actuator in a system having at least one actuator; and determining an address for the actuator based on the positioning of at least one end-stop of the actuator.

2. The method of claim 1, further comprising recording the address and downloading a control program for the actuator.

3. The method of claim 1, wherein an actuator is identified using a single end-stop.

4. The method of claim 1, wherein an actuator is identified using a position of a first end-stop relative to a second end-stop.

5. The method of claim 1, wherein an actuator is identified using a position of an end stop and a reference.

6. The method of claim 1, wherein a configuration of the at least one end stop is selected from the group consisting of linear and rotary.

7. The method of claim 1, wherein at least one end-stop for the actuators is identified using an encoder.

8. The method of claim 1, wherein at least one end-stop for the actuator is identified using time.

9. The method of claim 1, wherein at least one end-stop for the actuator is identified using an electronic integration function.

10. The method of claim 1, wherein at least one end-stop for the actuator is identified using the step count of a stepper motor.

11. The method of claim 1, wherein at least one end-stop for the actuator is identified using angular information.

12. The method of claim 1, wherein the actuators are identical except for their end stops.

13. A positioning apparatus, comprising:
   at least one actuator;
   a control bus, operably connected to the at least one actuator; and
   a controller, operably connected to the control bus, wherein each actuator has at least one unique end-stop, and the address of each actuator is determined by identifying said end-stop.

14. The apparatus of claim 13, wherein the actuators are identical except for their respective end-stops.

15. The apparatus of claim 13, wherein the control bus is connected to the actuators through a harness.

16. The apparatus of claim 15, wherein the harness has a number of wires selected from the group consisting of zero, one, two and three.

17. The apparatus of claim 13, further comprising a motor vehicle, in which the apparatus is installed and in which the actuator acts to control a heating or cooling system of the motor vehicle.

* * * * *